Aug. 4, 1964 J. A. HAGER 3,143,246

LEAD FEEDING APPARATUS

Filed Aug. 17, 1962 2 Sheets-Sheet 1

Inventor:
James A. Hager
by Henry P. Truesdell
His Attorney

Aug. 4, 1964 J. A. HAGER 3,143,246

LEAD FEEDING APPARATUS

Filed Aug. 17, 1962 2 Sheets-Sheet 2

Inventor:
James A. Hager
by Henry P. Truesdell
His Attorney 3,143,246

LEAD FEEDING APPARATUS

James A. Hager, Highland Heights, Ohio, assignor to General Electric Company, a corporation of New York Filed Aug. 17, 1962, Ser. No. 217,726
2 Claims. (Cl. 221—232)

This invention relates to apparatus for feeding electrical lead wires, or the like, individually or in groups to other lead handling equipment as utilized in the manufacture of electric lamps or other electrical devices.

For example, in the manufacture of electric lamps, current-conducting lead wires often require glass-to-metal sealing or other operations. The leads frequently comprise two wire sections of different diameters or metallic compositions butt welded together. Usually such leads must be fed individually, or several at a time, to equipment designed to seal one of the wire sections to glass or other ceramic material. It is difficult to feed the relatively delicate lead wires from large groups or masses of the leads, especially so if there is occasional flash at the butt weld or misalignment or bend in the wires. Weld knots and non-straight smaller diameter sections of lead wires can cause interference, bunching, bridging and tangling of the leads in such groups. These difficulties are overcome, and effective feeding and delivery are accomplished by apparatus constructed in accordance with the instant invention.

Accordingly, the primary object of the invention is to provide a new and improved lead feeding apparatus.

Another object of the invention is to provide new and improved apparatus for feeding lead wires having sections of different diameters into manufacturing equipment with the larger diameter end first.

Another object is to provide new and improved apparatus for feeding lead wires one at a time, or several at a time, from a large mass of the leads and delivering them to associated manufacturing equipment.

Briefly, in accordance with one aspect of the invention, a quantity of electrical lead wires are stacked on a platform parallel to each other to form a group of leads which are arranged in vertical position. The group of leads is held pressed against the curved surface of a cylinder mounted to oscillate about a vertical axis. The arrangement is such that one of the lead wires will be moved into seated position in a slot formed on the curved surface. As the cylinder rotates in one direction, the seated lead wire is moved laterally away from the group to a position such that it may drop vertically from the slot as an individual lead for delivery to other equipment in the manufacturing process. Return rotation of the cylinder again brings the slot opposite the group of lead wires to receive another lead. In this way, as the cylinder oscillates back and forth, individual lead wires are taken from the group and fed one by one to other equipment. By providing the cylinder with a plurality of slots on its circumference and arranging several groups of leads around the periphery of the cylinder, it is possible to feed several lead wires at a time upon each oscillation of the cylinder.

The subject matter of the invention is particularly pointed out and distinctly claimed in the concluding portion of this specification. However, further objects and advantages of the invention, and the construction and operation of the apparatus, will become apparent from the following description taken in connection with the accompanying drawing in which:

Figure 3:
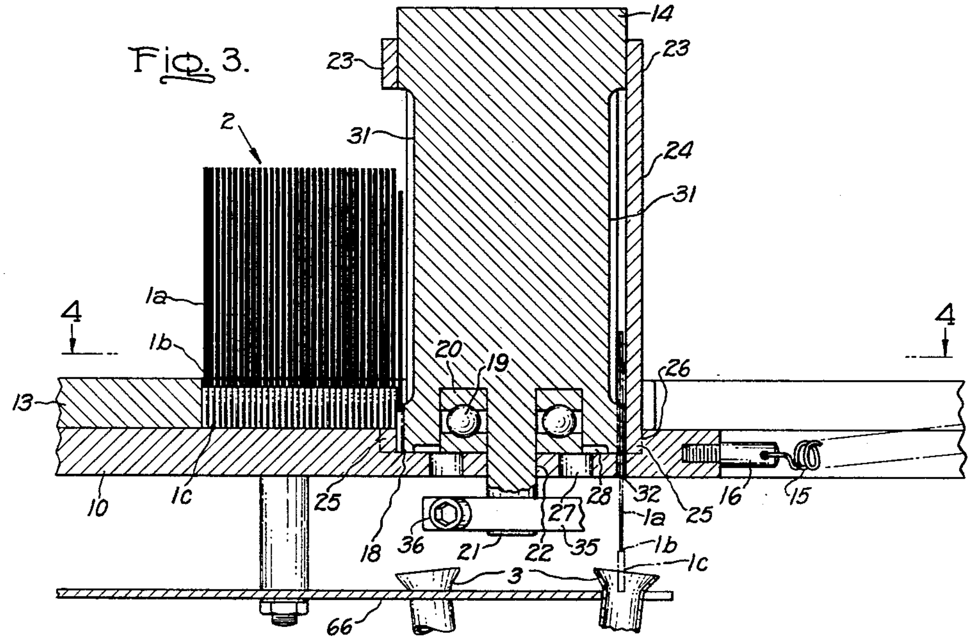
FIG. 3 is a sectional view taken along the line 3—3 of FIG. 1 showing a partial view of the apparatus in elevation on an enlarged scale.

Referring to FIG. 3, the apparatus of the instant invention is especially well suited to feed individual electrical lead wires 1 from a group of such lead wires, indicated by the arrow 2, and deposit the lead wires in any suitable containers such as a funnel 3 for transfer to other equipment using the lead wires in the manufacture of lamps or other electrical devices. The lead wires illustrated by way of example are two-part leads. One part is a .016 inch diameter Dumet wire 1*a* butt welded as shown at 1*b* to a larger .035 inch diameter nickel wire 1*c*. As so constructed, the larger diameter nickel wire portion 1*c* provides a ready means of assembling the lead wires in parallel relationship in the group 2 with the portion 1*c* serving as a base to support the lead in a vertical position. As a result, the opposite end portions, comprising the thinner and more easily deformable Dumet wires, extend upwardly in generally parallel relationship even though some may be slightly bent or twisted as a result of handling or the manufacturing operation. As a result, the lead wires may be handled individually by apparatus now to be described.

Figures 1, 2, 5:
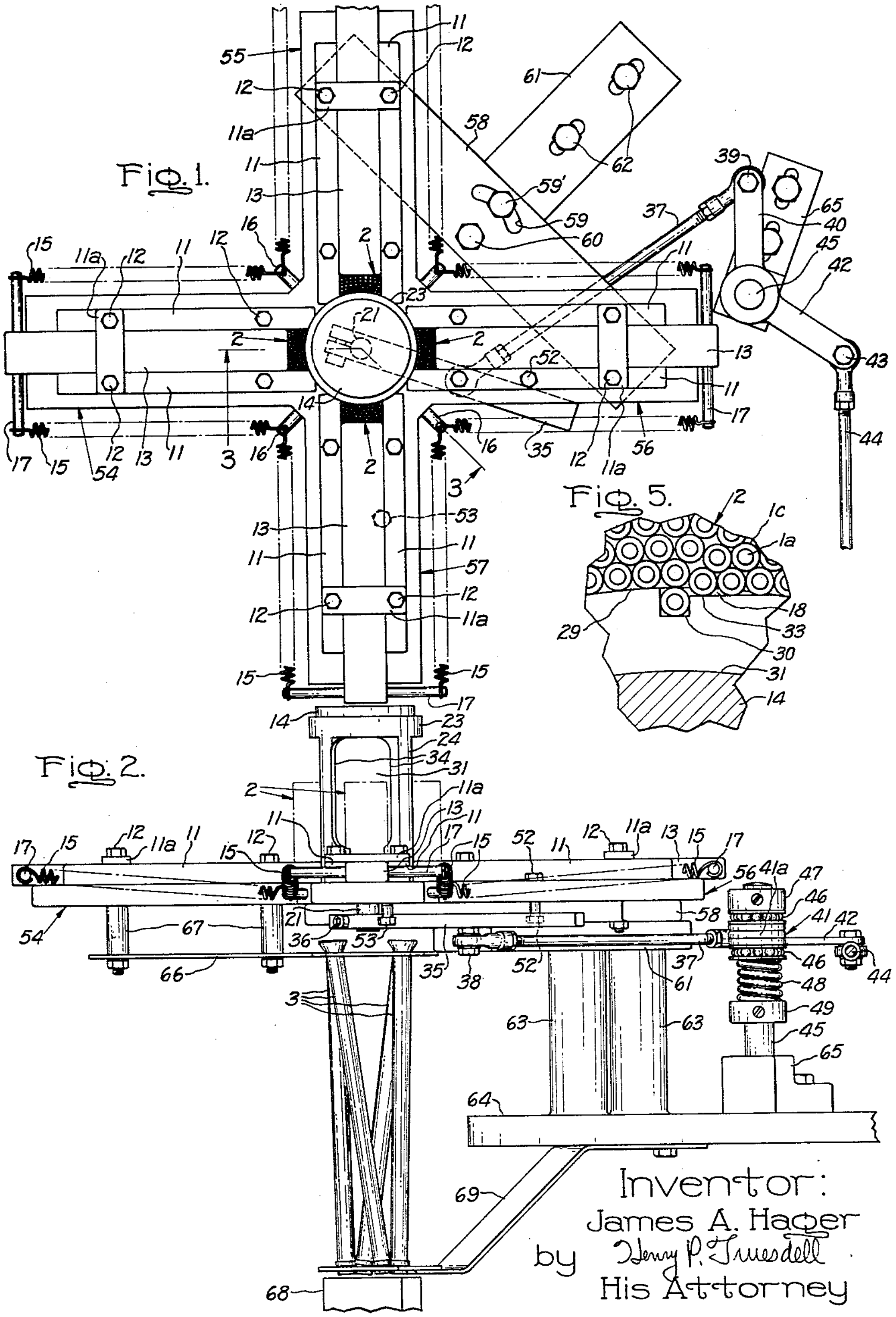
FIG. 1 is a plan view of the apparatus embodying the invention.
FIG. 2 is a side elevation view of the apparatus.
FIG. 5 is an enlarged fragmentary sectional view showing the manner in which the lead wires are engaged by the apparatus.
Figure 4:
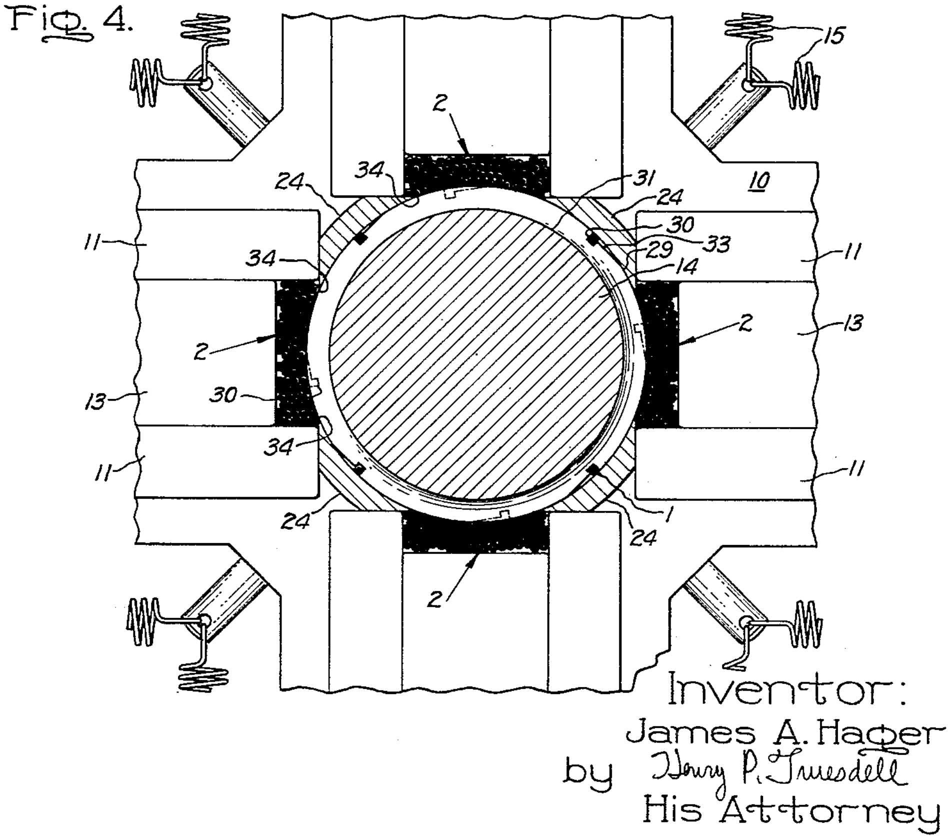
FIG. 4 is a sectional plan view taken along the line 4—4 of FIG. 3.

As shown in FIGS. 1 and 4, four separate groups 2 of the lead wires are spaced at 90° intervals around the center axis of the apparatus to provide for feeding four leads at a time. Correspondingly, four of the funnels 3 are provided, as shown in FIG. 2. Operation of the machine is symmetrical, and will be described with relation to one quadrant encompassing one of the lead wire groups 2.

Such a lead wire group 2, as best shown in FIG. 3 is assembled with the larger diameter wire portions 1*c* resting on a platform 10 so that the lead extends upwardly in generally vertical position. The leads are bunched together between spaced parallel guideways 11 fastened to platform 10 in any suitable manner as by bolts 12. A plunger 13, moving between the guideways, holds the lead wire group biased against an upstanding cylinder 14 located at the center axis of the apparatus. A strap 11*a* extends across the guideways 11 and is attached thereto by a pair of the bolts 12 to insure seating of plunger 13 in the guideways. Biasing action of plunger 13 is attained by tension springs 15 stretched between lugs 16 attached to platform 10 and a cross arm 17 fitted through the end of plunger 13. In this way the group 2 of lead wires is held firmly pressed against the curved surface of cylinder 14 for separating one at a time.

Removal of an individual lead wire from the group is accomplished by rotating cylinder 14 through a small arc across the face of the group. To this end, the lower portion of the vertically arranged cylinder is seated within a circular recess 18 offset below the surface of platform 10 and is supported on a ball bearing 19 located in the recess. Dust channels 27 and 28 prevent accumulating dust and dirt from entering the ball bearing raceway. The raceway of the ball bearing fits into a recess 20 in cylinder 14 so that a tongue 21 extends from the lower end of the cylinder through the center of the raceway and through an opening 22 in platform 10 located at the center of recess 18. As so mounted, the lower end of cylinder 14 rotates freely within the recess.

To guide its upper end, the cylinder 14 rotates within a circular bushing 23 supported on four spaced depending arms 24. These arms are joined to a circular bearing 25 which is brazed into the recess 18 in platform 10, as indicated at 26, so that the bearing forms the side wall of recess 18 to guide the lower end of cylinder 14. That lower portion of cylinder 14 rotating within the bearing 25 serves as a bearing surface 29 and is provided with four slots 30, equidistantly spaced around its periphery, one for each group 2 of the lead wires. Above the slots, and between bearing surface 29 and bushing 23, the cylinder is recessed around its entire periphery as indicated at 31 to provide space for the upper portions of the lead wires 1*a* in a manner to be described later.

Each slot 30 provides a means by which individual lead wires can be separated from the respective groups 2. With the cylinder so positioned that a slot 30 is in front of a grroup of lead wires, as shown in dotted outline in FIG. 4, a lead wire from each group is pushed by the biasing action of plunger 13 into the adjoining slot. As the cylinder 14 is moved in a small arc, in a clockwise direction as shown in FIG. 4, the lead wire within the slot is moved away from the group to a position over an opening 32 in the platform 10 shown by FIG. 3. When so positioned the lead drops out of the slot, through opening 32 and into one of the funnels 3. When the slots have thus been emptied, the cylinder is rotated counterclockwise to its initial position with the slots 30 again adjacent the groups of lead wires.

To facilitate entry of a lead wire into slot 30, the lower bearing surface 29 of the cylinder 14 is provided with an inward taper 33 extending towards one edge of slot 30. FIG. 5 shows the arrangement in enlarged view. It permits more room for several lead wires to crowd in adjacent the slot. When the slot is empty and the cylinder is rotating in a clockwise direction towards the tapered side of the slot, the taper permits one of the lead wires to move inwardly so that it is in better position to be engaged by the opposite edge of the slot for seating in the slot. Once a lead wire is in the slot, the taper and the lead wire in the slot create a disturbance in the group as they rotate laterally past the face of the remainder of the group, and thereby aid in preventing bridging or jamming of individual lead wires in the group.

On entering the slot, the lead wire is moved by plunger 13 beyond the edge of the surface of platform 10 supporting the group of lead wires. Gravity then causes the lead wire to fall vertically a limited distance below the level of the group onto recess 18, as shown in FIG. 3. This provides a vertical separation of any weld knots 1*b* that might be present on the individual lead wire and in the group of lead wires. A lead wire having entered the slot and fallen onto the circular recess is thus separated both horizontally and vertically from the group of lead wires. The recess 31 in cylinder 14 provides space so that any misalignment or bends in the top sections 1*a* of the leads will not interfere with the cylinder 14. In addition, the recess 31 provides a small space between the groups of lead wires and the outer periphery of cylinder 14 to prevent frictional engagement of the groups with the cylinder. The edges 34 of the depending arms 24 are closely mated to the lower bearing surface 29 of cylinder 14 and prevent the lead wires in the groups from following after the lead wire in the slot as the cylinder rotates the seated lead wire away from the group. As the cylinder 14 oscillates back and forth, it separates one lead from each of the four groups, feeding these leads into the delivery funnels, one set on each cycle.

One suitable form of mechanism for oscillating the cylinder 14 is illustrated in FIGS. 1 and 2. On its bifurcated end, a primary lever 35 is clamped onto the tongue 21 by bolt 36. An actuating shaft 37 is connected to the primary lever 35 in a pivoting manner by a pin 38. The opposite end of the actuating shaft is pivoted by pin 39 to a first lever 40 connected, in turn, by means of a friction clutch 41 to a second lever 42. This second lever is pivotally connected by pin 43 to a reciprocating shaft 44 driven by any suitable means not shown. By means of the linkage described, movement of the reciprocating shaft determines the degree of rotation of cylinder 14 and is adjusted to provide approximately a 60° angle of oscillation.

The clutch 41 shown by FIG. 2 includes a friction pad 41*a* mounted between the levers 40 and 42. This assembly is pivoted on a shaft 45 and is held between two conventional sets of ball bearings 46 mounted respectively on shaft 45 between a top collar 47 and a spring 48 held in place by a bottom collar 49. Adjustment of the vertical position of the bottom collar 49 allows an optimum pressure to be applied to the friction pad 41*a*, thereby allowing slippage only when a harmful degree of jamming would otherwise occur in the mechanism. Normally, the clutch is engaged so that levers 40 and 42 act together as a bell crank to transmit reciprocation of shaft 44 to corresponding motion of shaft 37 for rotation of cylinder 14.

If for some reason the cylinder 14 should jam and fail to oscillate relative to the groups of leads, the friction clutch will allow the reciprocating bar 44 to continue its travel without damaging the equipment. In case the friction clutch is required to slip on one stroke, for example the feeding stroke in which the cylinder rotates in a clockwise direction, a return stop 52 engaging lever 35 will prevent the cylinder from over-travelling in the opposite direction when the cylinder is returned counterclockwise to its initial position. The forward stop 53 serves a like purpose in case the equipment should jam on the return stroke. Operation of the apparatus as described allows a lead wire to be selected from a group and dropped into a delivery tube on each oscillation of the cylinder 14 under controlled actuation from shaft 44.

Although operation of the machine has been described with respect to one group of lead wires, actually the machine is so constructed as to feed lead wires symmetrically from each of four groups located in four quadrants. Platform 10 is divided into four wings 54, 55, 56 and 57 as indicated by arrows in FIG. 1. Two of the wings, 55 and 56, are attached to a mounting plate 58 by means of the bolts 12. An adjusting slot 59 allows the mounting plate 58 to be rotated about a pivot bolt 60 on frame plate 61 for optimum positioning where it is held by tightening bolt 59′ extending through slot 59 into plate 61. Attached beneath the frame plate 61 by suitable means such as bolts 62, two vertical columns 63 anchor the apparatus to the base plate 64. Also attached to the base plate, the clutch bracket 65 supports the pivot shaft 45 of friction clutch 41. The delivery tubes 3 are positioned at their upper ends by a funnel plate 66 which is held in place by the bolts 12 extending beneath the platform wing 54 and spaced therefrom by collars 67 on each of the four bolts 12. At their lower ends, the delivery tubes are held positioned over a suitable transfer magazine 68 by the delivery tube bracket 69, as shown in FIG. 2.

In accordance with the invention, the apparatus described allows fast and reliable feeding of lead wires. The use of an oscillating cylinder is important for the purpose of increasing the operational speed. Reliability of the apparatus is considerably improved by the inward taper on the leading edge of the slot and the vertical separation of the selected lead wire from the group, particularly when handling lead wires or similar items having weld flash or other irregularities tending to hold the items together. The recessed peripheral portion of the cylinder used in this embodiment of the invention is of advantage in handling two-part lead wires of various diameters.

What I claim as new and desire to secure by Letters Patent of the United States is:

1. Apparatus for feeding lead wires from a group comprising, in combination, a platform having an area for supporting a group of lead wires arranged in a parallel manner in vertical position, said platform being provided with a recessed surface having an opening therein, a cylinder having a cylindrical surface provided with a vertical slot for receiving at least one individual lead wire, a portion of said cylindrical surface being tapered inwardly toward one edge of said slot to facilitate entry of a lead into said slot as said cylinder oscillates, said cylinder having a recessed portion above said slot to prevent interference of the cylinder with the upper portions of said lead wires, means mounting said cylinder on said platform for oscillation about a vertical axis, means for pressing the group of lead wires against said curved and tapered surfaces so that a lead wire enters said slot and drops onto said recessed surface, means for oscillating said cylinder to move the lead wire in said slot away from the group and to align it with said opening so that the lead wire falls out of said slot through said opening, and means for returning said cylinder to its initial position.

2. Apparatus for feeding lead wires from a group comprising, in combination, a platform having an area for supporting a group of lead wires arranged in a parallel manner in vertical position, said platform being provided with a recessed surface having an opening therein, a cylinder having a cylindrical surface provided with a vertical slot for receiving at least one individual lead wire, a portion of said cylindrical surface being tapered inwardly toward one edge of said slot to facilitate entry of a lead into said slot as said cylinder oscillates, said cylinder having a recessed portion above said slot to prevent interference of the cylinder with upper portions of said lead wires, means mounting said cylinder on said platform for oscillation about a vertical axis, means for pressing the group of lead wires against said curved and tapered surfaces so that a lead wire enters said slot and drops onto said recessed surface, means for oscillating said cylinder to move the lead wire in said slot away from the group and to align it with said opening so that the lead wire falls out of said slot through said opening, means positioned below said opening for delivering the lead wire to a desired location so that the lead wire on dropping through said opening is intercepted by said delivery means and is delivered to a desired location, and means for returning said cylinder to its initial position.

References Cited in the file of this patent

UNITED STATES PATENTS 2,918,198 Kjellsen et al. ---------- Dec. 22, 1959
3,039,588 Harnack -------------- June 19, 1962

FOREIGN PATENTS 1,046,640 France ---------------- Dec. 8, 1953